Oct. 30, 1956   E. G. METZLER   2,768,800
RESILIENT AIRCRAFT WING MOUNTING
Filed May 6, 1952   2 Sheets-Sheet 1
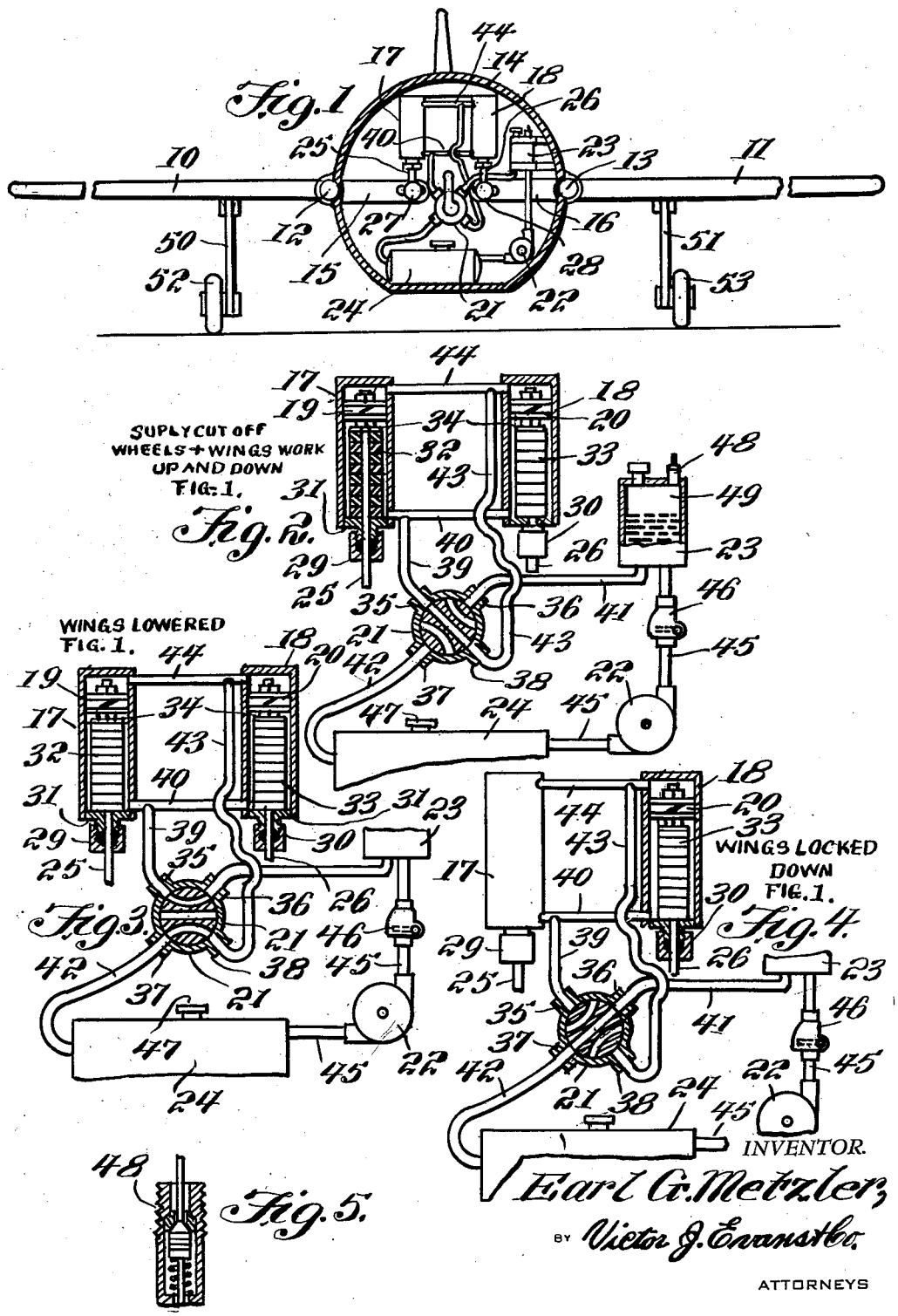

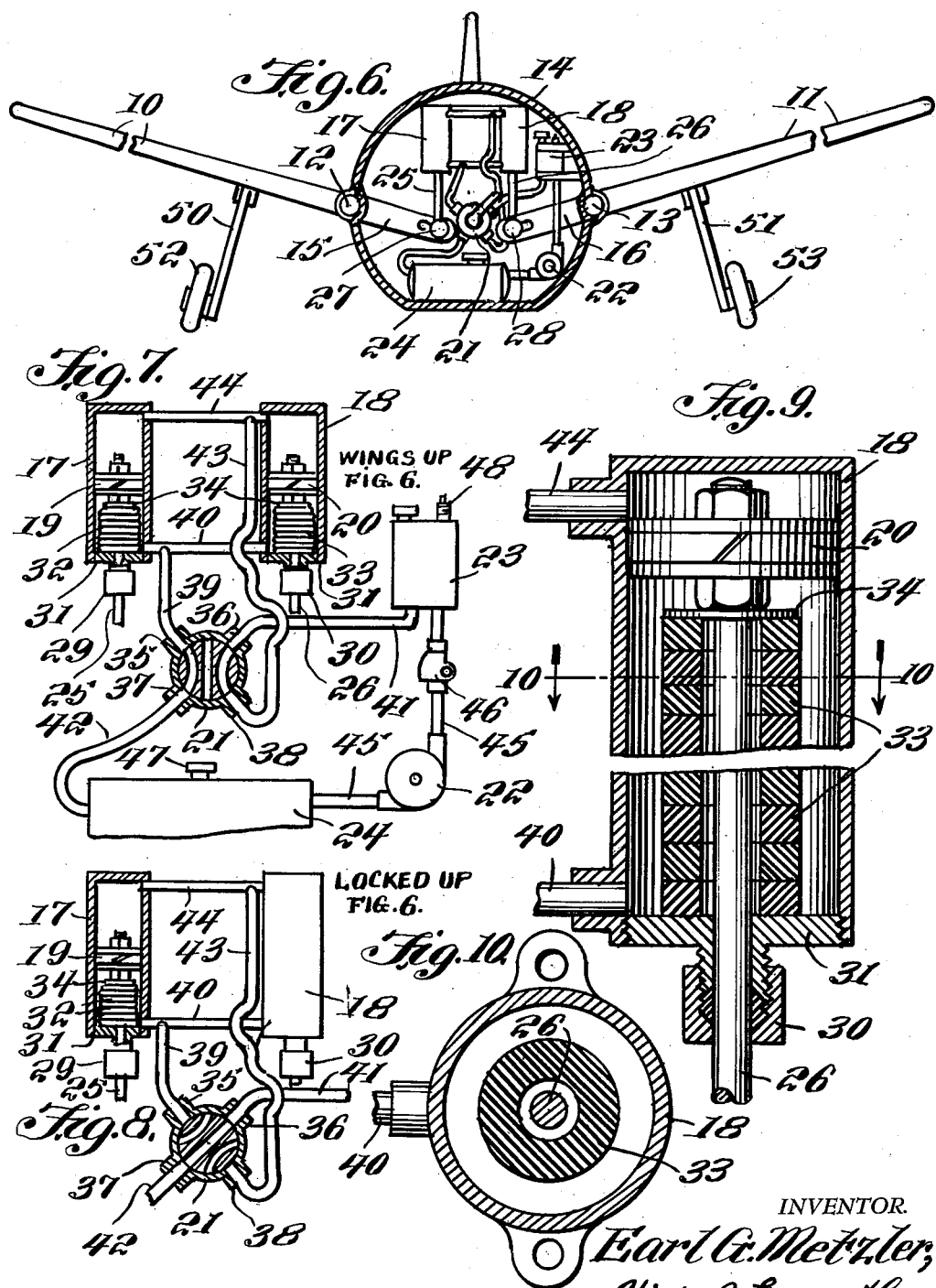

United States Patent Office 2,768,800
Patented Oct. 30, 1956

2,768,800

RESILIENT AIRCRAFT WING MOUNTING

Earl G. Metzler, Latrobe, Pa.

Application May 6, 1952, Serial No. 286,327

1 Claim. (Cl. 244—38)

This invention relates to aircraft having pivotally mounted wings and particularly of the type where wings of an airship are pivotally mounted in the walls of the fuselage and arms from the wings extend inwardly so that the inwardly extended ends may be held with shock absorbers.

The purpose of this invention is to provide means for absorbing excessive and shock loads placed on wings of airplanes by air bumps and quick turns particularly in manuevers.

With the conventional type of wing mounting air bumps and quick turns necessitated by war manuevers cause terrific strains on wings of aircraft and it is necessary for an aviator to use caution continuously to prevent shearing wings from the ship.

Various types of shock absorbers have been used in combination with airplane wings, however, conventional springs, even though they are formed of heavy material, are not sufficient as the shock load developed in such manuevers carries the springs beyond their elastic limit and the springs break. With this thought in mind this invention contemplates a combination of rubber washers positioned around piston rods in cylinders in combination with oil or other fluid under pressure whereby the rubber washers eliminate the hammer blow resulting from completely compressed springs and the combination of the resilient material with the fluid provides yielding means for definitely checking upward movement of the wings.

The object of this invention is, therefore, to provide means for incorporating cylinders having fluid pressure and resilient bumpers therein in aircraft whereby the cylinders provide shock absorbers for wings of the aircraft.

Another object of the invention is to provide means for forming shock absorbers for aircraft wings wherein pistons in cylinders are controlled by a combination of oil and air pressure with rubber washers providing safety stops and equalizers whereby wings are retained in substantially neutral positions.

A further object of the invention is to provide resilient means for retaining wings of aircraft in equalized positions wherein the wings are held by the combination of oil, air, and resilient elements in which the retaining elements are of a simple and economical construction.

With these and other objects and advantages in view the invention embodies an airplane having wings pivotally mounted in the sides thereof with arms extended inwardly from the wings and connected to piston rods extended from pistons in cylinders, and means for controlling a supply of oil and air to the cylinders whereby the oil and air coacts with resilient bumpers in the cylinders for absorbing shock loads applied to the under surfaces of the wings.

Other features and advantages of the invention will appear from the following description taken in connection with the drawings, wherein:

Figure 1 is a front elevational view of an airplane with the forward end of the plane broken away to illustrate the position of shock absorbing cylinders, an accumulator, and an oil supply tank therein.

Figures 2, 3, 4, 7 and 8 are substantially diagrammatic views illustrating relative positions of connections to the shock absorbing cylinders.

Figure 2 shows a vertical section through a pair of cylinders adapted to be positioned in an airplane with the cylinders connected with a four way control valve, with the valve connected to an accumulator, oil supply tank and pump and with a ball check valve positioned between the pump and accumulator.

Figure 3 is a similar view with the four way valve turned so that the lower end of the cylinders are connected to the accumulator or pressure and the opposite ends of the cylinders are connected to the oil return or supply tank which is not under pressure.

Figure 4 is also a similar view showing the four way valve turned to such a position that both ends of the cylinders are closed, the pressure being equalized on both sides of the pistons thereof.

Figure 5 is a detail illustrating an air inlet valve, similar to a Schraeder valve and with which air may be supplied to the accumulator.

Figure 6 is a view similar to that shown in Fig. 1 wherein the wings are forced upwardly by pressure against the undersurfaces thereof or by the wheels striking obstructions, and wherein the pistons are drawn downwardly to the positions illustrated in Fig. 7.

Figure 7 is a view similar to that shown in Fig. 2 with the four way valve turned to such a position that pressure is applied to the upper ends of the cylinders and pressure in the lower ends of the cylinders is relieved.

Figure 8 is a view similar to that shown in Fig. 4 wherein the connections to both ends of the cylinders are closed.

Figure 9 is a vertical section through one of the cylinders with parts broken away.

Figure 10 is a cross section through the cylinder shown in Fig. 9 taken on line 10—10 of Fig. 9.

Referring now to the drawings wherein like reference characters denote corresponding parts the aircraft wing mounting of this invention includes wings 10 and 11 pivotally mounted on pins 12 and 13, respectively in the sides of a fuselage 14, arms 15 and 16, extended from the inner ends of the wings, cylinders 17 and 18 positioned in the fuselage and having pistons 19 and 20 therein, a four way valve 21 for controlling the flow of fluid to the cylinders and also the return of fluid from the cylinders, a pump 22 for supplying fluid under pressure, an accumulator 23 and an oil supply tank 24.

The arms 15 and 16 extended from the inner ends of the wings are connected to connecting rods 25 and 26, respectively by pins 27 and 28 and the piston rods extend through packing glands 29 and 30 on heads 31 of the cylinders.

The cylinders 17 and 18 are provided with a plurality of washers, as indicated by the numerals 32 and 33, the washers being made of rubber or other suitable resilient material, and being positioned around the connecting rods as shown in Fig. 9 whereby washers 34 at the upper ends of the resilient washers transmit the load resulting from a downwardly disposed force on the connecting rods to the resilient washers.

The four way valve 21 is provided with ports 35, 36, 37 and 38, the port 35 being connected to the lower ends of the cylinders 17 and 18 with tubes 39 and 40, the port 36 being connected to the accumulator 23 with a tube 41, the port 37 being connected to the oil supply tank 24 with a tube 42, and the port 38 being connected to the upper ends of the cylinders 17 and 18 with tubes 43 and 44. The pump 22 is provided in a connection 45 from the oil supply tank 24 to the accumulator 23 and a check valve 46 is provided in the connection.

The oil supply tank 24 may be provided with a filling plug 47 and an air valve 48 may be positioned in the upper part of the accumulator so that air under pressure may be supplied, such as from an air hose of a filling station, to the upper part of the accumulator to provide an air cushion, as indicated by the numeral 49 in the upper end, of the casing of the accumulator.

By this means, and with the valve 21 turned to the position illustrated in Fig. 3 fluid is supplied to the lower parts of the cylinders, particularly in the form of liquid when oil is used and as the liquid is not compressible the force is conveyed to the accumulator to compress air in the compartment 49 in the upper end of the accumulator. By this means the excessive loads on the wings of the aircraft are absorbed by the resilient washers in combination with the air and oil fluids and with the compressive pressure of the fluids increased by the pump 22 comparatively heavy loads may be taken by the cylinders.

Operation

The parts are assembled as illustrated and described with the wings 10 and 11 pivotally mounted by the pins 12 and 13 on the sides of the fuselage of an aircraft and the hydraulic cylinders 17 and 18 are connected between parts of the wings and fuselage whereby upward movement of the wings draws the pistons in the cylinders against the rubber washers 33 so that extreme shock loads do not snap the pistons against ends of the cylinders. There is a limit to which the rubber washers may be compressed so that there will always be some resilient material between the pistons and ends of the cylinders regardless of the load.

The positions and movements of the pistons are also controlled by the pressure of the fluid and the pressure of the fluid is regulated by the pump 22. Extreme loads transmitted by the pistons to the oil in the system increases the pressure of oil in the accumulator 23 and air in the pocket or compartment 49 yields, or is compressed to correspond with the pressure transmitted to the oil by the pistons. The small pockets or amount of air in the chamber or compartment 49 makes it possible for oil in the cylinders to give or yield to correspond with the pressure or load.

In the design shown the wings 10 and 11 are provided with struts 50 and 51 and wheels 52 and 53, respectively are carried by the lower ends of the struts.

It will be understood that modifications may be made in the design and arrangement of the parts without departing from the spirit of the invention.

What is claimed is:

In an aircraft, the combination which comprises a fuselage having sides, a pair of wings each pivotally mounted at a point intermediate of the length thereof in the opposed sides of the fuselage with inner ends of the wings extended through the sides of the fuselage and into the interior thereof, cylinders mounted in the fuselage and angularly disposed relative to said wings, pistons in the cylinders, connecting rods extended from the pistons and through the ends of the cylinders, means pivotally and slidably connecting extended ends of the connecting rods to the inner ends of the wings, washers of resilient material in the cylinders and positioned between the pistons and ends of the cylinders from which the piston rods extend, a reservoir positioned in the fuselage, a pump positioned in the fuselage, a multiple port valve mounted in the fuselage, a gas accumulator also positioned in the fuselage, tubes connecting ports of the valve to upper and lower ends of the cylinders and to reservoir and gas accumulator, and additional tubes connecting the discharge of said pump to the gas accumulator and the intake of said pump to the reservoir.

References Cited in the file of this patent

UNITED STATES PATENTS

| Number | Name | Date |
|---|---|---|
| 165,623 | Amethells | July 13, 1875 |
| 1,544,032 | Potez | June 30, 1925 |
| 1,791,484 | Dowty | Feb. 3, 1931 |
| 1,819,414 | Gruss | Aug. 18, 1931 |
| 2,186,558 | Rouanet et al. | Jan. 9, 1940 |
| 2,470,232 | Bennett | May 17, 1949 |
| 2,603,435 | Metzler | July 5, 1952 |

FOREIGN PATENTS

| Number | Country | Date |
|---|---|---|
| 106,639 | Great Britain | June 7, 1917 |